(12) United States Patent
Rokosky

(10) Patent No.: US 8,295,457 B2
(45) Date of Patent: Oct. 23, 2012

(54) SYSTEM AND METHOD FOR CONTROLLING FREE PHONE CALLS THROUGH AN INSTITUTIONAL PHONE SYSTEM

(75) Inventor: James P. Rokosky, Altoona, PA (US)

(73) Assignee: DSI-ITI, LLC, Mobile, AL (US)

( * ) Notice: Subject to any disclaimer, the term of this patent is extended or adjusted under 35 U.S.C. 154(b) by 1139 days.

(21) Appl. No.: 11/861,824

(22) Filed: Sep. 26, 2007

(65) Prior Publication Data

US 2009/0080629 A1 Mar. 26, 2009

(51) Int. Cl.
*H04M 3/42* (2006.01)
*H04W 12/06* (2009.01)

(52) U.S. Cl. .................. 379/114.02; 455/411

(58) Field of Classification Search ............ 379/114.02, 379/114.05; 455/411
See application file for complete search history.

(56) References Cited

U.S. PATENT DOCUMENTS

| | | | |
|---|---|---|---|
| 2003/0076940 A1* | 4/2003 | Manto | 379/114.05 |
| 2005/0043014 A1* | 2/2005 | Hodge | 455/411 |
| 2005/0123111 A1* | 6/2005 | Philbin et al. | 379/114.2 |
| 2007/0041545 A1* | 2/2007 | Gainsboro | 379/188 |

* cited by examiner

*Primary Examiner* — Rasha Al Aubaidi
(74) *Attorney, Agent, or Firm* — Sterne, Kessler, Goldstein & Fox P.L.L.C.

(57) ABSTRACT

A method of controlling free phone calls placed from within a secured premises through an institutional phone system generally includes assigning a unique access identifier to an individual caller upon entry into the secured premises; receiving a destination number from the individual caller within the secured premises, the destination number being associated with a telephone located outside the secured premises; determining if the destination number is a per se free number, and, if the destination number is not determined to be a per se free number: receiving the unique access identifier from the individual caller; validating the unique access identifier; and, if the unique access identifier is valid, processing a telephone call to the destination number.

20 Claims, 2 Drawing Sheets

SYSTEM AND METHOD FOR CONTROLLING FREE PHONE CALLS THROUGH AN INSTITUTIONAL PHONE SYSTEM

BACKGROUND OF THE INVENTION a. Field of the Invention

The instant invention relates generally to telecommunication services that are provided through an institutional phone system, such as the phone system in a correctional institution. In particular, the instant invention relates to a system and method for managing and monitoring free phone calls placed through an institutional phone system.

b. Background Art

In the correctional industry, inmate phone calls are often controlled through sophisticated call processing equipment. The call processing equipment controls various aspects of the use of the telephone in order to meet a variety of competing concerns including security, accessibility, and revenue generation. One objective of an inmate telephone system is to maximize the security of the system and to also maximize the revenue produced by the system while providing the inmate with accessibility to reasonable telecommunication services as authorized by the institution.

One feature that inmate phone systems may provide is the ability to maintain lists of allowed or blocked phone numbers by inmate, by class of inmate, or globally for a facility. Such lists allow the institution to regulate who an inmate can and cannot call. As an example of a list applied to a specific inmate, an inmate may be allowed to call his wife, but may not be allowed to call a co-defendant. As an example of a global list, all inmates may be allowed to call the local public defender's office, but may be disallowed from calling local judges. This feature balances the concern for security (e.g., disallowing calls to victims, witnesses and judges) with the concern of allowing an inmate with accessibility for legally mandated purposes (e.g., calls to the public defender) or personal reasons (e.g., calls to family members).

Another feature that an inmate telephone system may provide is the ability to monitor and record calls. This feature addresses the security concerns of the facility by allowing internal investigators to monitor what is occurring inside the institution and among the inmate population. This feature address the security concerns of society generally by allowing external investigators access to phone conversations that relate to the investigation of activities external to the institution.

Another feature that an inmate telephone system may provide is the recording and retrieval of call detail information (e.g., the identity of the caller, the called party, the time of the call, and the like). This feature is important to addressing the concerns of security and revenue. Call detail records allow investigators to research data such as the inmate that placed the call, the phone number that was dialed, what time the call was placed, and how long the conversation lasted. This research can often be performed by call, by inmate, by called number, by time of call and by any combination thereof. Investigators can analyze this data to determine patterns and connections between people and places that are relevant to internal and external investigations. Call detail records are also the fundamental data required for billing calls and managing revenue.

Another feature that an inmate telephone system may provide is the ability to alert and/or notify an investigator of a call of interest. This feature allows an investigator to be notified when a specific inmate makes a phone call, when a specific phone number is dialed, or a combination thereof. This feature addresses the both internal and external security needs by immediately alerting an investigator when a person or pattern of interest is identified and allowing the investigator to immediately monitor the call, review the call details, review the call recording, or any combination thereof, for example to gather intelligence.

A function of substantially all inmate phone systems is to enable the billing of phone calls. Inmate telephone systems provide different methods for inmates to place and pay for calls. For example, call payment options may include collect calling (wherein the called party pays for the call), debit calling (wherein the inmate pays for the call with funds from their commissary account), pre-paid calling cards, and pre-paid accounts associated with a called number.

BRIEF SUMMARY OF THE INVENTION

While the inmate phone systems and features described above address, to a certain extent, the balance between security, accessibility, and revenue, it is desirable to improve control over the use of the phones in the secured premises by inmates or offenders that have not yet been processed into the phone system and issued their identifier (e.g., a TID). This scenario typically occurs in the booking or intake area of a facility, but can exist in other areas of an institution where inmates are held prior to being fully inprocessed. Arrestees or inmates may remain in the intake area of an institution for hours or more, during which time they remain unprocessed into the phone system. In many jurisdictions, inmates have a right to make one phone call to a family member, a lawyer, or an organization. The "one phone call" that an inmate is granted is typically provided at no cost while the inmate is waiting to be inprocessed, before a TID or other identifier has been issued to the inmate for use with the institutional telephone system.

Inmate phone providers often accommodate the "one phone call" requirement by allowing all calls made from phones in the intake or booking area to be made at no charge to the inmate or called party and without any TID or other identifier being provided by the inmate. This substantially unrestricted access, however, negatively impacts security and revenue. Though inmates are often permitted a limited number of free phone calls upon arrest and intake to a correctional institution, the reality is that inmates often have unrestricted access to the free telephones while they remain in the intake area awaiting processing. This situation exists because the alternative requires correctional officers to physically control and regulate inmate access to and use of the free telephone. In most institutions, it is not feasible for an officer to provide this level of control, as the officers are fully tasked with processing inmates and maintaining physical security of the intake area. Further, because the inmate phone provider is typically responsible for absorbing the operating cost of carrying the free booking calls, institutional managers (e.g., superintendents and wardens) are often unwilling to commit officer resources to provide physical control over the free phones even if resources are otherwise sufficient to do so. As a result, both the inmate phone provider and the institution lose significant revenue as inmates make unrestricted free phone calls while waiting to be processed. This loss of revenue is relatively easy to quantify.

Less measurable are the negative effects that uncontrolled access to inmate calling services has on security. With unlimited free call access while awaiting processing, arrestees can use the inmate calling system not only to make permitted calls (e.g., to an attorney or family member), but also to make impermissible calls (e.g., to a witness or victim). Further, without the use of some form of authentication or identification on a free phone call, investigators lose the ability to utilize the investigative tools discussed above (e.g., searching call recordings, analyzing call details of a specific inmate, discovering relationships between inmates and called telephone numbers), and many other investigative capabilities.

It is an object of the present invention to enable an inmate telephone system to provide free calls.

Implementation of many of the features discussed above relies upon the ability to identify the inmate using the phone. In order to implement features specific to the inmate using the phone, the phone system must provide some way to authenticate and/or identify the user. This can be done, for example, through the use of a Telephone ID (TID), a biometric, or other authentication technique.

It is an object of the invention disclosed herein to improve the balance between security, revenue, and accessibility in connection with free calls made using an institutional telephone system.

While the booking facility is often located within the corrections facility, it is contemplated that the booking facility may also be located offsite. In either situation, the booking facility is preferably a secured premises with controlled ingress and egress.

The present invention provides a method of controlling free phone calls placed from within a secured premises through an institutional phone system. This method generally includes the steps of: assigning a unique access identifier to an individual caller upon entry into the secured premises; receiving a destination number from the individual caller within the secured premises, the destination number being associated with a telephone located outside the secured premises; determining if the destination number is a per se free number, and, if the destination number is not determined to be a per se free number: receiving the unique access identifier from the individual caller; validating the unique access identifier; and if the unique access identifier is valid, processing a telephone call to the destination number. Optionally, the method includes: defining a database of per se free numbers, wherein the step of determining if the destination number is a per se free number includes checking the database of per se free numbers to determine if the destination number matches an entry in the database of per se free numbers. In some embodiments of the invention, the step of validating the unique access identifier includes: comparing the unique access identifier to a database of active access identifiers to determine whether the unique access identifier matches an entry in the database of active access identifiers; and determining whether one or more free calls remain authorized for the unique access identifier.

The present invention also provides a method of controlling free phone calls placed using an institutional telephone system, generally including the following steps: storing a database of unique access identifiers, the database of unique access identifiers including a plurality of active access identifiers; receiving an access identifier from a caller attempting to place a free call using the institutional telephone system; checking the database of unique access identifiers to determine if the received access identifier matches one of the plurality of active access identifiers; and if the received access identifier matches one of the plurality of active access identifiers, permitting the caller to place a free call using the institutional telephone system. Typically, the plurality of active access identifiers includes those unique access identifiers currently authorized for one or more free calls (e.g., unexpired in-service access identifiers with one or more free calls remaining).

Also disclosed herein is a system for controlling free phone calls placed through an institutional phone system. The system includes: at least one telephone device; an access identifier database, the access identifier database including a plurality of active access identifiers; an access identifier input device coupled to the at least one telephone device; and a free call control processor that determines whether a destination number input at the at least one telephone device is a per se free number and, if the destination number is not a per se free number, validates an access identifier input at the access identifier input device against the access identifier database. The access identifier input device may be a telephone keypad (e.g., the keypad on the at least one telephone device). Alternatively, the access identifier input device may be a biometric input device (e.g., a fingerprint scanner).

The present invention advantageously provides functionality beyond the functionality provided by many inmate phone providers. The invention disclosed herein provides a method to control the number of free calls made by an inmate that is awaiting processing in the phone system. In addition, the present invention advantageously provides a mechanism for investigators to identify the inmate participating in a free call for purposes of analysis and investigation. The present invention thereby addresses the shortcomings of existing inmate phone systems, leading to increased security and revenue, without adversely impacting the reasonable access of an incarcerated individual to telecommunications services.

The foregoing and other aspects, features, details, utilities, and advantages of the present invention will be apparent from reading the following description and claims, and from reviewing the accompanying drawings.

DETAILED DESCRIPTION OF THE INVENTION

The present invention provides a method and system for controlling free telephone calls made using an institutional telephone system. The term "institutional telephone system" (or "institutional phone system") as used herein refers to a telephone system installed in an environment wherein it is desirable to control or regulate telephone usage, including, without limitation, correctional facilities, military installations, hospitals, schools, business offices, and government offices. Though the present invention will be described in connection with the corrections industry, and in particular in connection with a telephone system that permits free calls in a correctional facility's initial holding and/or inprocessing area, it should be understood that the invention is not so limited. One of ordinary skill in the art will appreciate that the principles disclosed herein may be employed to good advantage in any telephone system where it is desirable to regulate or control the placement of telephone calls.

The free call control system according to the present invention may be implemented as an enhancement to an inmate telephone system, such as the ITI Offender Communication System. Of course, the free call control system disclosed herein may also be implemented in connection with other inmate telephone systems, including, but not limited to, Global Tel*Link's LazerPhone system, Securus Technologies' Secure Call Platform, Pay-Tel Communications, Inc.'s inmate telephone system, and PCS Corporation's Inmate Communications Systems. One of ordinary skill in the art will generally appreciate the functions and capabilities of an inmate telephone system. Thus, inmate telephone systems, such as those listed above, are described herein only to the extent necessary to understand the present invention.

Figure 1:
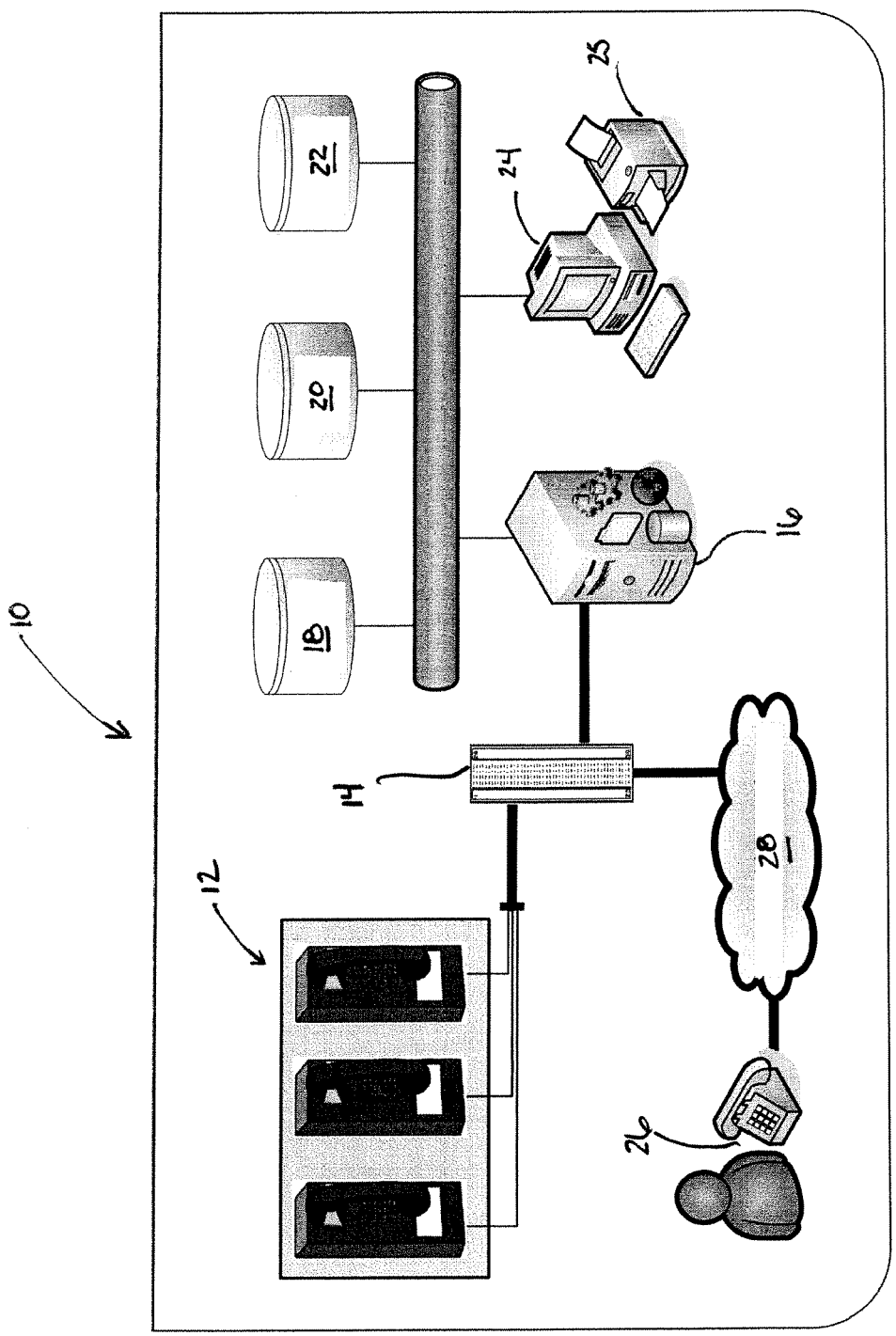
FIG. 1 is an overview of an inmate telephone system including free call control functionality according to an embodiment of the present invention.

FIG. 1 is a schematic illustration of a free call control system 10, for example an inmate telephone system including free call control functionality. The free call control system generally includes one or more telephone devices 12 (referred to herein as "free phones"), which are coupled to one or more phone system servers 16, for example through connection block 14. One of ordinary skill in the art will appreciate that telephone devices 12 may be coupled to phone system servers 16 through other means, such as hard-wiring, without departing from the spirit and scope of the present invention. Only one phone system server 16 is illustrated in FIG. 1 for the sake of clarity.

The phone system server 16 is coupled to one or more databases, such as an inmate database 18, a configuration database 20, and an access ID database 22. The term "database" as used herein includes, but is not limited to, relational databases in which a plurality of data sets are associated with each other and stored, preferably as one or more records. The database may be stored in a single medium or may be stored in multiple media interconnected by a network. The term "database" also includes any collection of related data organized and stored in an electronic format (e.g., a delimited ASCII file).

Free call control system 10 may also include one or more workstations 24 coupled to one or more printers 25. As described in further detail below, workstations 24 and printers 25 may be used to issue free call access IDs to individuals.

A caller using one of the free telephones 12 may be connected to a called party 26 through network 28, which may be the PSTN, a cellular network, VOIP, or any other telephony network technology.

Free call control system 10 utilizes a set of configuration items to control behavior of the system, such as the number of free calls that an individual may place. Configuration items may also include the length of an access ID, the number of free calls that an access ID may be used to complete, the length of time that an access ID is valid after it is issued, the length of time that an access ID is valid after its first use, the length of time after which an expired access ID may be reused (e.g., recycle time), and the like. Thus, configuration items facilitate adapting the free call control system 10 to the various operational rules of the facility in which free call control system 10 is installed.

Preferably, configuration items are stored in configuration database 20. One of ordinary skill in the art will appreciate, however, that configuration items may be stored in a variety of other ways, such as in a properties file or an initialization file, without departing from the spirit and scope of the invention.

Free call control system 10 also typically contains a database 22 of access IDs. The term "access ID" refers to a unique identifier that can be recognized by the free call control system 10 to control the number of free calls being made by an individual. Access IDs may also be stored for future reference, for example to aid in identifying the individual that placed a particular call. As described above, it is contemplated that the syntax for access IDs, expiration of access IDs, recycle time of access IDs, and the like may be governed by configuration items stored in configuration database 20. Of course, database 22 of access IDs may include only currently valid/active access IDs (e.g., unexpired, in-service access IDs with free calls remaining), or all access IDs, both valid/active/in-service and invalid/expired/out-of-service. Each access ID stored within database 22 may be associated with additional information, such as a validity/invalidity (or active/expired) flag, the number of free calls remaining on the access ID, the time until the access ID expires, the time at which the access ID expires, and the like.

One suitable method of generating access IDs is to generate an access code as a random alphanumeric sequence of preset length (e.g., a six digit number). Depending on the configuration of the free call control system 10, this system-generated access ID may be set to expire within a preset time period after it is generated, a preset time period after it is first used to make a free call, after a preset number of free calls are placed using the access ID, or some combination thereof (e.g., the sooner of 30 minutes after first use or 3 free phone calls). Moreover, the configuration of the free call control system 10 may provide that an expired access ID may be reused after it has been inactive for a preset period of time (e.g., after a period of 30 days).

System-generated access IDs are preferably produced on a printed output that may be provided to the arrestee for use in placing one or more free calls. This concept is analogous to providing an arrestee with a quarter for a payphone to place one call, in that it facilitates having a finite limit on the number of free calls that can be placed, but provides for much greater flexibility and control over the process. In some embodiments of the invention, the workstation 24 and attached printer 25 are used to print free call access ID cards for distribution to arrestees. These free call access ID cards may be provided on a two part form containing the access ID and, in some embodiments of the invention, instructions for using the telephone 12. One part of the form containing the access ID (and, if present, the instructions) can be given to the arrestee, while the other part of the form containing the access ID can be attached to the arrestee's intake record to aid in identifying and searching calls made by the arrestee (e.g., to facilitate identification of the arrestee that possessed a particular access ID during a particular time frame). If desired, the access ID can also be transferred to the inmate phone system (or, alternatively, to an offender management system) for the purpose of enabling the inmate-related security and investigation features of an inmate phone system listed above. For example, the access ID can be associated with the inmate's record in the inmate phone system and/or offender management system as an additional item of data by which the inmate's telephone calls may be searched.

As an alternative to system-generated access IDs, access IDs may be accepted as unique numbers from an external system, such as the arrest number from a police records management system, provided, of course, that the externally-generated identifier is unique.

In still other embodiments of the invention, a biometric, such as a voiceprint or a fingerprint, may be used as the access ID. If a biometric is being used as the access ID, a configuration item may be provided that "resets" the number of free calls allowed to the access ID after a preset period of time. This allows for an individual who is re-arrested to receive additional free calls upon re-arrest.

Of course, it is also within the spirit and scope of the present invention to combine multiple forms of access ID (e.g., requiring both a system-generated access ID and a biometric).

The free call control system 10 may also be coupled to a database 18 of inmate or arrestee information. One of ordinary skill in the art will appreciate that this database 18 may be contained within the free call control system 10, within an inmate telephone system, within an offender management system, or any combination thereof. The inmate database 18 may contain, for example, identification and demographic data about inmates that have used the phone system. The inmate database 18 contemplated by the present invention is typically populated at some point after the inmate has used the phone system to place one or more free calls and the inmate has been enrolled into the inmate telephone system (or, alternatively, into an offender management system). It is also within the spirit and scope of the present invention, however, to populate the inmate database 18 prior to use of the telephones 12 by the inmates (e.g., during initial booking).

In embodiments where the free call control system 10 is associated with an inmate telephone system and/or offender management system, it is contemplated that the access ID may be associated with an inmate's record after the inmate has ultimately been enrolled into the inmate telephone system and/or offender management system. Thus, any call records and recordings of any calls made by the inmate using the free call access ID may be merged to the inmate's record in the inmate telephone system or offender management system. This advantageously incorporates all inmate calls under one telephone ID (TID), whether placed before or after enrollment into the inmate telephone system and/or offender management system, such that all calls ever placed by the inmate are readily available through the security and investigative tools that may be provided by the inmate phone system and/or offender management system.

Phone system server 16 includes a free call control processor. The term "processor" as used herein refers to a computer microprocessor and/or a software program (e.g., a software module or separate program) that is designed to be executed by one or more microprocessors running on one or more computer systems. The free call control processor processes free calls in accordance with the present invention.

Figure 2:
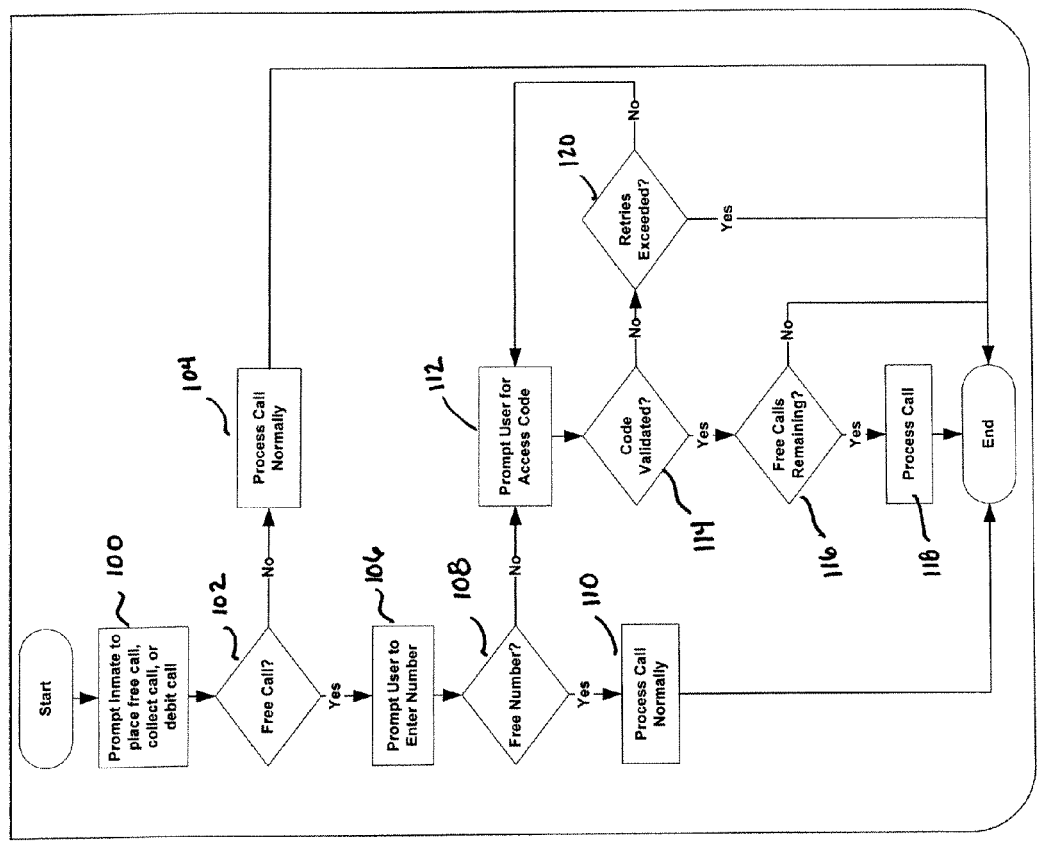
FIG. 2 is a flowchart that illustrates one method of free call processing according to the present invention.

One method of processing free calls will be described in connection with the flowchart of FIG. 2. In step 100, the free call control processor receives an input from the caller initiating the call using one of the plurality of free phones 12 to determine if a free call is being requested, or if a collect or debit call is being requested instead. If the caller has not requested a free call, the "NO" exit is taken from decision block 102, and the call is processed normally in step 104.

If the caller has requested to make a free call, the "YES" exit is taken from decision block 102, and the caller is prompted to input the destination number in step 106. The destination number is typically associated with a telephone located outside the secured premises. In decision block 108, the destination number is checked to determine if it is always allowed to be placed for free (a "per se free" number), such as a call to the public defender or to a local bail bondsman. If the destination number is per se free, the "YES" exit is taken from decision block 108 and the call is processed normally in step 110.

The free call control system 10 may utilize a free call database of per se free numbers. For example, a system administrator may define a free call database of phone numbers that are pre-approved as free calls, including, for example, an approved attorney's phone number, a legal aid phone number, and the like. Preferably, the numbers used to populate the free call database are associated with telephones located outside the secured premises from which the inmates make their calls. One of ordinary skill in the art will appreciate that this free call database may be contained within the free call control system 10, within an inmate telephone system, within an offender management system, or any combination thereof. It should also be appreciated that the database of per se free numbers may be included in configuration database 20. The free call database may then be accessed to see if the number requested to be dialed is contained within the pre-established list of per se free numbers.

If the number is not per se free (e.g., it is not contained in the free call database), the "NO" exit is taken from decision block 108 and the caller is prompted to enter a free call access code in step 112. As described above, the free call access code may be a system-generated access ID, another access ID, a biometric, or a combination thereof.

In decision block 114, the access code is validated. That is, the input access code is checked against access codes in the access ID database 22. If the input access code is valid (e.g., it matches an active, in-service access ID in the database 22), the "YES" exit is taken from decision block 114, and the access code is checked to determine whether free calls remain (e.g., whether the input access code complies with a configuration item stored in configuration database 20) in decision block 116. If free calls remain, the "YES" exit is taken from decision block 116, and the free call is processed in step 118 (e.g., the caller is connected to the called party 26 via telephony network 28). If all free calls have been exhausted, the "NO" exit is taken from decision block 116, and the process ends.

If the input access code is invalid (e.g., it does not match an active, in-service access ID in the database 22), the "NO" exit is taken from decision block 114, and, in decision block 120, the system determines whether the caller is permitted to retry entry of the access code. It should be understood that the maximum permissible number of retries may be provided as a configuration item stored in configuration database 20. If further retries remain, the "NO" exit is taken from decision block 120, and the process returns to step 112. If no further retries remain, the "YES" exit is taken from decision block 120, and the process ends.

Although several embodiments of this invention have been described above with a certain degree of particularity, those skilled in the art could make numerous alterations to the disclosed embodiments without departing from the spirit or scope of this invention. For example, though the present invention has been described in connection with a single phone system server 16 including a single free call processor, the methods described above may be executed by one or more computer systems, including suitable input, output, and storage devices or interfaces, and may be software implemented (e.g., one or more software programs or modules executed by one or more computer systems of processors), hardware implemented (e.g., a series of instructions stored in one or more solid state devices), or a combination of both. The computer may be a conventional general purpose computer, a special purpose computer, a distributed computer (such as two physically-separated computers that are linked via an intranet or the Internet), or any other type of computer. Further, the computer may comprise one or more processors, such as a single central processing unit or a plurality of processing units, commonly referred to as a parallel processing environment.

Therefore, it is intended that all matter contained in the above description or shown in the accompanying drawings shall be interpreted as illustrative only and not limiting. Changes in detail or structure may be made without departing from the spirit of the invention as defined in the appended claims.

What is claimed is:

1. A computer implemented method for limiting a quantity of free phone calls placed by a pre-processed user through a phone system serving a secured premises, comprising:

assigning a temporary unique access identifier to the pre-processed user upon entry into the secured premises by the pre-processed user, wherein the temporary unique access identifier is assigned before the pre-processed user is processed and assigned a permanent unique access identifier;

verifying whether the temporary unique access identifier is valid for the free phone call requested by the pre-processed user, wherein the temporary unique access identifier is verified for the free phone call before the pre-processed user is processed and assigned the permanent unique access identifier;

connecting the free phone call without charging the pre-processed user when the temporary unique access identifier is valid for the free phone call, wherein the free phone call is connected before the pre-processed user is processed and assigned the permanent unique access identifier; and denying the connection of the free phone call when the temporary unique access identifier is invalid for the free phone call, wherein the connection of the free phone call is denied before the pre-processed user is processed and assigned the permanent unique access identifier.

2. The computer implemented method of claim 1, further comprising:
tracking the quantity of each free phone call placed by the pre-processed user based on the temporary unique access identifier;
tracking free phone call information of each free phone call placed by the pre-processed user based on the temporary access identifier;
storing free phone call information of each free phone call placed by the pre-processed user based on the temporary access identifier; and
transferring the free phone call information stored for the temporary access identifier to the permanent access identifier when assigned to the pre-processed user.

3. The computer implemented method of claim 1, further comprising:
terminating the unique access identifier for the pre-processed user when the user is processed and assigned the permanent unique access identifier.

4. The computer implemented method of claim 1, further comprising:
providing a quantity of allowed free phone calls to be connected for the temporary unique access identifier;
deducting a unit from a quantity of allowed free phone calls each time the free phone call is connected; and
denying the connection of an additional free phone call when the quantity of allowed free phone calls has been deducted to substantially zero.

5. The method of claim 4, wherein the denying further comprises:
denying the connection of the additional free phone call when a period of allowed free phone calls for the temporary unique access identifier is expired.

6. The method of claim 4, further comprising:
resetting the quantity of allowed free phone calls to be connected for the temporary unique access identifier after the pre-processed user is processed and assigned the permanent unique access identifier.

7. The computer implemented method of claim 1, wherein the verifying comprises:
determining whether a destination phone number for the free phone call is an authorized destination phone number, wherein the authorized destination phone number includes a destination that is substantially likely not to be harmed by the connection of the free call.

8. The computer implemented method of claim 7, further comprising:
determining whether the destination phone number for the free phone call is a per se free phone call, wherein the per se free phone call is substantially always connected; and
automatically connecting the per se free phone call without verifying whether the temporary unique access identifier is valid.

9. The computer implemented method of claim 8, wherein a quantity of allowed per se free phone calls is substantially unlimited.

10. The computer implemented method of claim 1, wherein the temporary unique access identifier is assigned to the pre-processed user when the pre-processed user is in an intake area for the secure premises.

11. A system for limiting a quantity of free phone calls placed by a pre-processed user through a phone system serving a secure premises, comprising:
an access identifier database configured to store a plurality of temporary unique access identifiers, wherein the plurality of temporary unique access identifiers is stored before the pre-processed user is processed and assigned a permanent unique access identifier;
an access identifier database controller configured to assign the temporary unique access identifier from the plurality of temporary unique access identifiers that is included in the access identifier database to the pre-processed user, wherein the temporary unique access identifier is assigned to the pre-processed user before the pre-processed user is processed and assigned the permanent unique access identifier; and
a free call control processor configured to:
verify whether the temporary unique access identifier is valid for a free phone call requested by the pre-processed user,
connect the free phone call without charging the pre-processed user when the temporary unique access identifier is valid for the free phone call, and
deny the connection of the free phone call when the temporary unique access identifier is invalid for the free phone call,
wherein the temporary unique access identifier is verified and the free phone call is connected or denied before the pre-processed user is processed and assigned the permanent unique access identifier.

12. The system of claim 11, wherein the free call control processor is further configured to:
provide a quantity of allowed free phone calls to be connected for the temporary unique access identifier;
deduct a unit from a quantity of allowed free phone calls each time the free phone call is connected; and
deny the connection of an additional free phone call when the quantity of allowed free phone calls has been deducted to substantially zero.

13. The system of claim 11, wherein the free call control processor is further configured to deny the connection of the additional free phone call when a period of allowed free phone calls for the temporary unique access identifier is expired.

14. The system of claim 11, wherein the free call processor is further configured to:
track the quantity of each free phone call placed by the pre-processed user based on the temporary unique access identifier;

track free phone call information of each free phone call placed by the pre-processed user based on the temporary unique access identifier; and transfer the free phone call information stored for the temporary access identifier to the permanent access identifier when assigned to the pre-processed user.

15. The system of claim 14, further comprising:
a configuration database is configured to:
store the quantity of each free phone call placed by the pre-processed user based on the temporary unique access identifier; and
store free phone call information of each phone call placed by the pre-processed user based on the temporary access identifier.

16. The system of claim 11, wherein the access identifier database controller is further configured to remove the temporary unique access identifier for the pre-processed user from the access identifier database when the pre-processed user is processed and assigned the permanent unique access identifier.

17. The system of claim 11, wherein the free call control processor is further configured to determine whether a destination phone number for the free phone call is an authorized destination phone number, wherein the authorized destination phone number includes a destination that is substantially likely not to be harmed by the connection of the free phone call.

18. The system of claim 17, wherein the free call processor is further configured to:
compare the destination phone number to a plurality of per se free phone call phone numbers included in a free call database;
determine whether the free phone call is a per se free phone call based on whether the destination phone number is included in the free call database, wherein the per se free phone call is substantially always connected; and
automatically connect the per se free phone call without verifying whether the temporary unique access identifier is valid.

19. The system of claim 18, wherein a quantity of allowed per se phone calls is substantially unlimited.

20. The system of claim 11, wherein the temporary unique access identifier is assigned to the pre-processed user when the pre-processed user is in an intake area for the secure premises.

* * * * *